US012419802B1

(12) United States Patent
Burton

(10) Patent No.: US 12,419,802 B1
(45) Date of Patent: Sep. 23, 2025

(54) ROLLATORS WITH PLATFORMS FOR ASSISTING A PERSON TO RAISE ONESELF

(71) Applicant: Philip Burton, Zebulon, NC (US)

(72) Inventor: Philip Burton, Zebulon, NC (US)

( * ) Notice: Subject to any disclaimer, the term of this patent is extended or adjusted under 35 U.S.C. 154(b) by 0 days.

(21) Appl. No.: 18/891,676

(22) Filed: Sep. 20, 2024

Related U.S. Application Data

(60) Provisional application No. 63/652,219, filed on May 28, 2024.

(51) Int. Cl.
*A61H 3/04* (2006.01)
*A61H 3/00* (2006.01)

(52) U.S. Cl.
CPC ......... *A61H 3/04* (2013.01); *A61H 2003/004* (2013.01); *A61H 2003/046* (2013.01)

(58) Field of Classification Search
CPC ................................. A61H 3/04; E06C 1/397
See application file for complete search history.

(56) References Cited

U.S. PATENT DOCUMENTS 2,685,325 A * 8/1954 Webster ............... A61G 5/0833 297/30
3,224,530 A * 12/1965 King ...................... A47C 12/02 297/30
4,911,263 A * 3/1990 Kuperman .............. E06C 1/397 182/16
5,409,028 A * 4/1995 Lee .......................... A61H 3/04 280/47.35
5,887,887 A * 3/1999 Keuning .................. A61H 3/04 280/47.38
6,039,149 A * 3/2000 Bedja ...................... E06C 1/397 182/20
6,378,883 B1 * 4/2002 Epstein .................... A61H 3/04 180/65.6
6,478,326 B1 * 11/2002 Lee .......................... A61H 3/04 280/639
6,651,994 B2 * 11/2003 Hallgrimsson ...... A61G 5/0883 280/87.041
6,659,478 B2 * 12/2003 Hallgrimsson ........ A61G 5/125 280/643
7,052,030 B2 * 5/2006 Serhan ...................... B60T 1/04 280/647
7,547,027 B2 * 6/2009 Bohn ........................ A61H 3/04 280/87.021
9,381,132 B2 * 7/2016 Chen ........................ A61H 3/00
9,687,411 B2 * 6/2017 Chen ........................ A61H 3/00
2002/0070533 A1 * 6/2002 Owens ..................... A61H 3/04 280/647
2003/0209385 A1 * 11/2003 Kuehl ..................... E06C 1/397 182/17
2011/0193305 A1 * 8/2011 Li ............................ A61H 3/04 280/47.34

* cited by examiner

*Primary Examiner* — Noah Chandler Hawk
(74) *Attorney, Agent, or Firm* — Olive Law Group, PLLC

(57) ABSTRACT

Rollators with platforms for assisting a person to raise oneself are disclosed. According to an aspect, a rollator includes a frame having a front-facing portion. The rollator also includes handles attached to the frame. Further, the rollator includes wheels attached to the frame. The rollator also includes platforms attached to the front-facing portion of the frame.

14 Claims, 4 Drawing Sheets

ROLLATORS WITH PLATFORMS FOR ASSISTING A PERSON TO RAISE ONESELF

CROSS REFERENCE TO RELATED APPLICATION

This application claims the benefit of U.S. Provisional Patent Application No. 63/652,219, filed May 28, 2024, and titled ROLLATORS WITH MULTIPLE, STEPPED PLATFORMS FOR ASSISTING A PERSON TO RAISE ONESELF, the disclosure of which is incorporated herein by reference in its entirety.

TECHNICAL FIELD

The presently disclosed subject matter relates generally to people mobility equipment and methods. Particularly, the presently disclosed subject matter relates to rollators with platforms for assisting a person to raise oneself.

BACKGROUND

There have many types of equipment developed for assisting people with mobility. These may be people with mobility challenges. Mobility equipment can assist such people to enable them to move more easily and safely. This equipment can be particularly important for those with disabilities, injuries, or age-related mobility issues.

Walkers and rollators are mobility equipment used to help people with walking challenges. Standard walkers can provide support and stability, and typically do not have wheels. Rollators are generally walkers with wheels, brakes, and a seat for resting.

Although there have been significant advancement with mobility equipment that meet a variety of general needs. However, there is a continuing need to develop improved mobility equipment that meets more specific needs of people with mobility challenges.

BRIEF DESCRIPTION OF THE DRAWINGS

Figure 1:
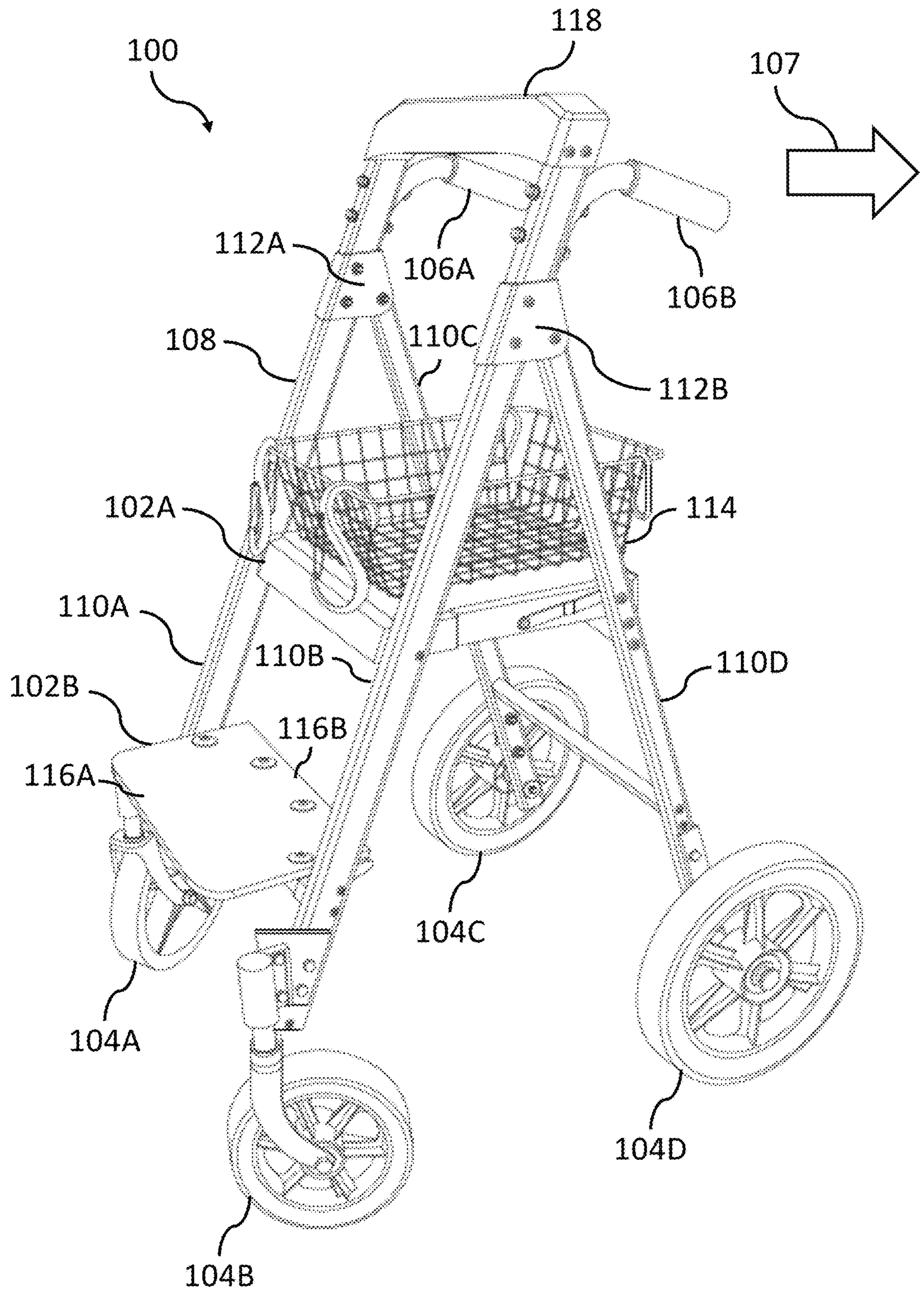
Figure 2:
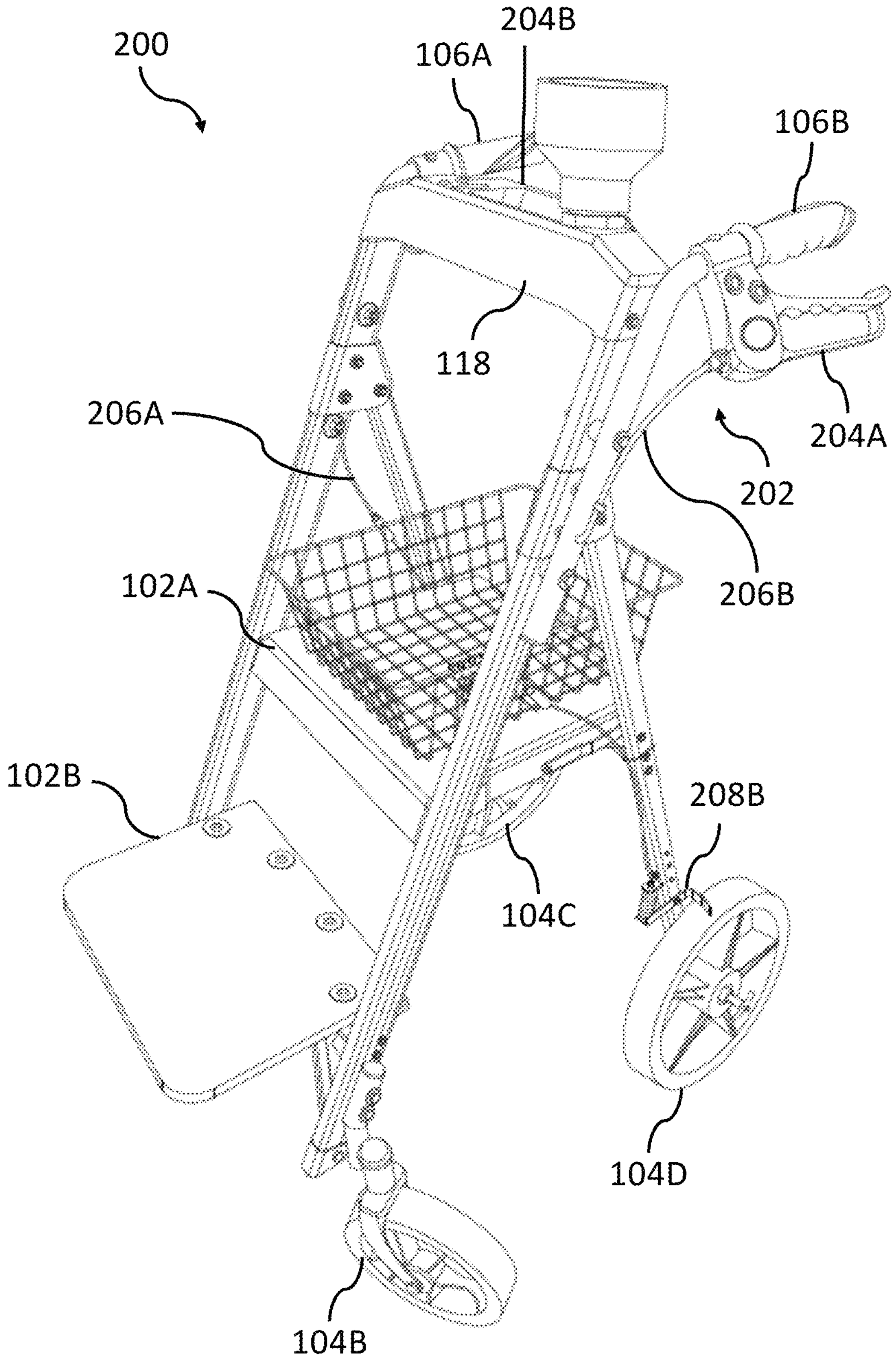
Figure 3:
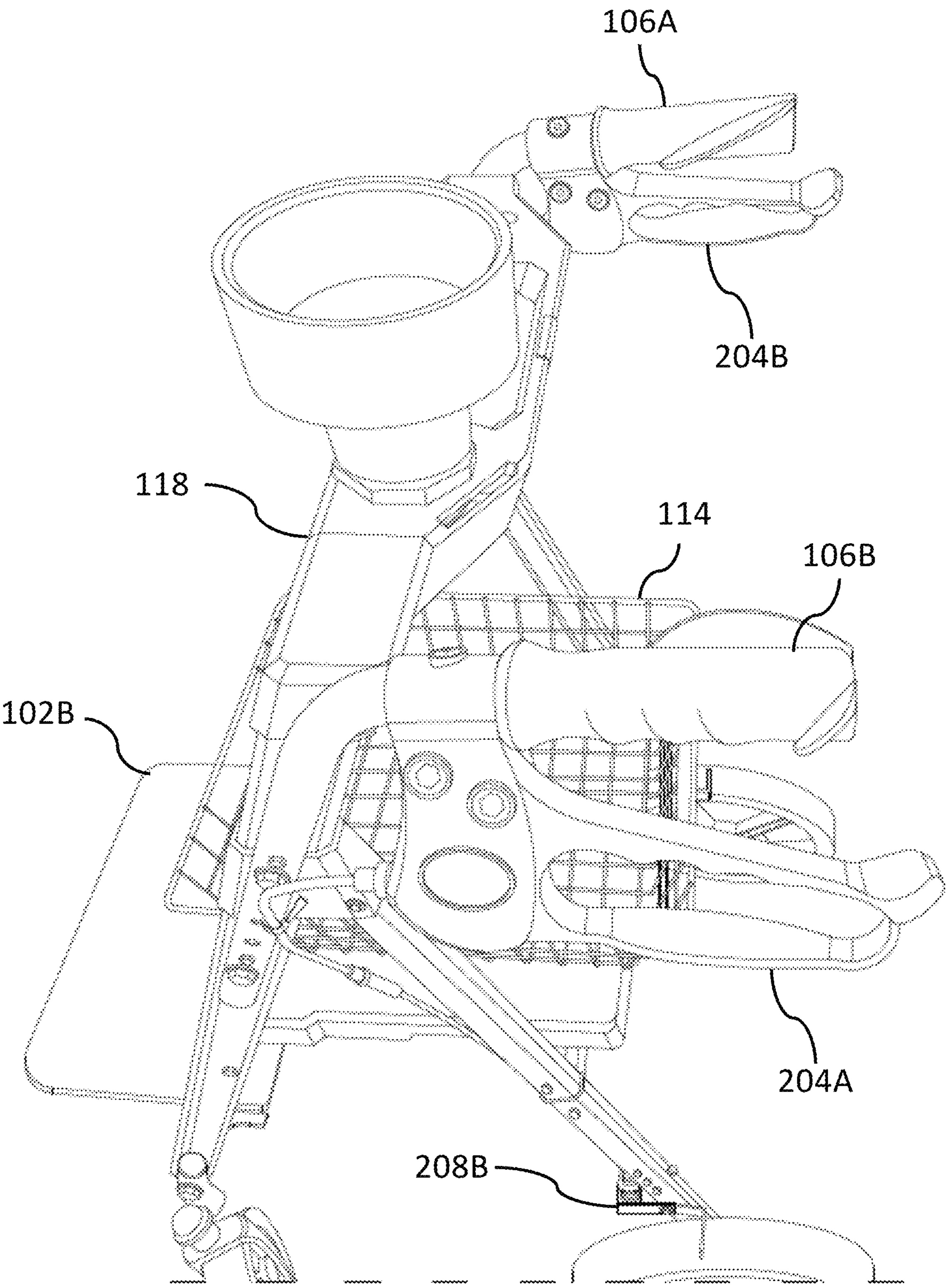
Figure 4:
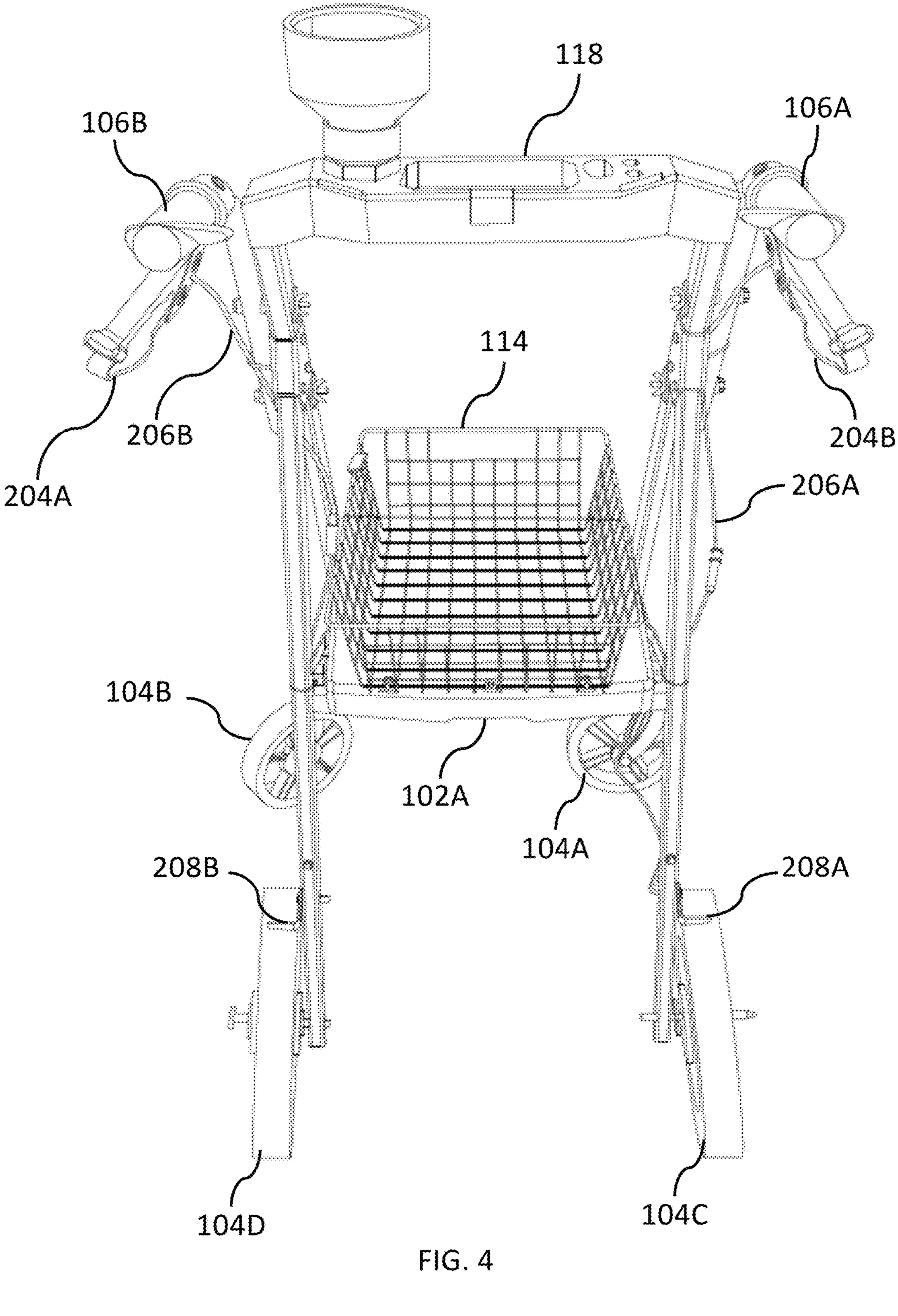

Having thus described the presently disclosed subject matter in general terms, reference will now be made to the accompanying Drawings, which are not necessarily drawn to scale, and wherein:

FIG. 1 is a perspective view of a rollator having platforms and wheels in accordance with embodiments; and FIGS. 2-4 illustrate different views of another rollator with platforms in accordance with embodiments of the present disclosure.

SUMMARY

The presently disclosed subject matter relates to rollators with platforms for assisting a person to raise oneself are disclosed. According to an aspect, a rollator includes a frame having a front-facing portion. The rollator also includes handles attached to the frame. Further, the rollator includes wheels attached to the frame. The rollator also includes platforms attached to the front-facing portion of the frame.

According to another aspect, a rollator includes a frame having a front-facing portion. The rollator also includes handles attached to the frame. Further, the rollator includes an upper platform attached to the frame. The rollator also includes a lower platform positioned lower than the upper platform. The lower platform includes a front portion and a rear portion. The front portion of the lower platform extends forward of the frame.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

In accordance with embodiments, FIG. 1 is a perspective view of a rollator 100 having platforms 102A, 102B and wheels 104A-104D. Referring to FIG. 1, the rollator 100 has 4 total large wheels 104A-104D including pair of turnable, front wheels 104A, 104B to facilitate steering and traversal of rough surfaces, such as gravel and uneven surfaces (e.g., sidewalk cracks and the like). In this example, the rear wheels 104C, 104D are not turnable but may be turnable in some embodiments. It is noted that the wheels may be of any suitably type, number, size, and shape. Of the 4 wheels 104-104D, the rear wheels 104C, 104D are a pair or large wheels in the rear for following the front wheels 104A, 104B to traverse rough surfaces. The wheels may be made of rubber, plastic or other durable material. In this example, the rear wheels are 12 inch wheels, and the front wheels are 8 inch wheels.

With continuing reference to FIG. 1, the rollator 100 includes a pair of handles 106A, 106B for grip by a person. The handles 106A, 106B are attached to a frame 108 of the rollator 100. In this example, the handles 106A, 106B are directed rearward (i.e., generally in the direction indicated by arrow 107) for holding by an operator. The frame 108 includes pairs of legs 110A-110D that extend from the handles 106A, 106B to each of the pairs of wheels 104A-

104D to generally form the frame 108. This frame 108 can be made of a suitable lightweight and rigid material such as metal (e.g., aluminum, titanium, or the like). Each leg 110A-110D has one of the wheels 104A-104D attached thereto in the positions as shown.

In embodiments, the pairs of legs 110A-110D are pivotally attached together at pivots 112A, 112B such that the pairs can be folded together for transport of the rollator 100. The rear legs 110C, 110D can pivot between different positions with respect to the front legs 110A, 110B. In one position as shown in FIG. 1, the rear legs 110C, 110D form an acute angle with respect to the front legs 110A, 110B. To move to a position for carry or other transport of the rollator 100, the rear legs can pivot about pivots 112A, 112B such that the angle formed with front legs 110A, 110B is lessened to compact the space occupied by the rollator 100 (e.g., to an angle less than the angle shown in FIG. 1 or such that the rear legs 110C, 110D are substantially parallel with the front legs 110A, 110B).

Arranged within and attached to the frame 108 are the platforms 102A, 102B. In this example, there are 2 stepped platforms 102A, 102B, but it should be appreciated that more than 2 platforms can be included in any suitable arrangement, size, and shape. Further in this example, there is an upper platform 102A and a lower platform 102B that is attached to the frame 108 above the lower platform 102B. Further, it is noted that the platforms are substantially parallel to a surface on which the wheels rest, although they may alternatively be slanted or otherwise suitably configured. The platforms 102A, 102B are rigid and suitably attached to the frame 108 (such as by bolts or welding) for carrying a weight of a person or other heavy weight. In this embodiment, the lower platform 102B is attached to the front legs 110A, 110B, and the upper platform 102A is attached to the front legs 110A, 110B, and the rear legs 110C, 110D.

A shown in FIG. 1, the lower platform 102B includes a front portion 116A and a rear portion 116B. The rear portion 116B is attached to the front legs 110A, 110B. The front portion 116A extends forward of the frame 108. In embodiments, the front portion 116A may extend forward of any part of the rollator 100. As a result in the case of a fall or other situation in which the operator is on the ground or floor, the operator can turn the rollator 100 to face the operator, and subsequently the operator can more easily lift oneself onto the lower platform 102. Subsequently, after sitting on the lower platform, the operator can lift oneself onto the upper platform 102A if desired before reaching a standing position.

In embodiments, the rollator 100 includes a removable basket 114 that is carried by the upper platform 102A. The basket 114 can carry the person's personal items or other items. In this example, the basket 114 comprises a wire frame but may alternatively be constructed by any suitable manner and material.

In other embodiments, the rollator's handles 106A, 106B may be rotatable about the top of the frame 108. This functionality of the handles 106A, 106B can enable the operator to more easily move the rollator in certain areas, such as narrow passageways. The rotatable handles may also have mechanisms for locking them in place as desired.

The rollator 100 includes a tray 118 that is removably attached to the frame 108. The tray 118 is attached to the frame 108 between the handles 106A, 106B for carrying items, such as a beverage container.

FIGS. 2-4 illustrate different views of another rollator 200 with platforms in accordance with embodiments of the present disclosure. Particularly, FIG. 2 depicts a perspective view of the rollator 200, FIG. 3 depicts a close view of an upper portion of the rollator 200, and FIG. 4 depicts a rear perspective view of the rollator 200. are other photographs of a rollator in accordance with embodiments of the present disclosure.

Referring to FIGS. 2-4, the rollator includes a braking mechanism, generally indicated by arrow 202, configured to brake one or more of the wheels. In this example, a left hand control mechanism 204A can be used to brake the left rear wheel 104D, and a right hand control mechanism 204B can be used to brake the right rear wheel 104C. Thus, the rear wheels 104C, and 104D can be individually and selectively braked by the operator.

The braking mechanism 202 can include a left brake line 206A and a right brake line 206B that are operatively connected to respective brakes 208A and 208B. By operation of the left hand control mechanism 204A and the right hand control mechanism 204B, the lines 206A and 206B can be pulled to operate the respective brakes 208A and 208B for slowing or stopping movement of respective wheels 104C and 104D.

In use of a collator 100 or 200 as described herein, a person holds to one or both handles 106A, 106B for standing support and for movement of the collator forward or backward. Also, the collator can be turned or moved side-to-side by rotation of the front wheels. Also, the braking mechanism 202 of the embodiment shown in FIGS. 2-4 can be utilized to lock or slow the rear wheels 104C, 104D to improve support of the person or to assist with turning.

In some use cases, the rollator may be utilized by a person for assisting a person in a low position to lift herself or himself higher. Particularly, the frontward facing platforms can be used by the person to gradually raise herself or himself by use of the steps. In one example, a person can be positioned in front of the rollator and be in a low position such as sitting or laying on the ground or floor. The person can then use the bottom platform to raise up to that level, such as by raising up to sit on the bottom platform. Subsequently, at a time when the person is ready, the person can then raise up to sit or be supported by the top platform to raise up to that higher level. Afterwards, the person can use the rollator (such as one or more of the platforms) to raise to a standing position and then rotate the rollator such that the person is at the back of the rollator and the handles are positioned for use.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A rollator comprising:

a frame having a front-facing portion, wherein the frame comprises a plurality of front legs and a plurality of rear legs;

handles attached to the frame and directed rearward, wherein the handles are positioned substantially within an area directly upward of the rear legs;

a plurality of wheels attached to the frame, wherein two of the wheels are attached to the front legs, wherein another two of the wheels are attached to the rear legs, wherein the two wheels attached to the rear legs are positioned substantially within an area directly downward of the handles; and a plurality of platforms attached to the front-facing portion of the frame, wherein the plurality of platforms comprises an upper platform and a lower platform, wherein the upper platform is securely attached to both the front legs and the rear legs of the frame above the lower platform, wherein the upper platform is substantially centered between the front legs and the rear legs, wherein the lower platform defines a flat upward facing surface that extends entirely between a forward position and a rearward position of where the lower platform is attached to the frame, wherein the flat upward facing surface of the lower platform also extends entirely between the front legs of the frame, wherein the lower platform is securely attached to only the front legs of the frame at a position above the two wheels that are attached to the front legs, and wherein the upper platform is positioned substantially outside of an area directly upward of the lower platform such that the lower platform is operable for a person to sit upright on the lower platform.

2. The rollator of claim 1, wherein the rear legs are pivotally attached to the front legs.

3. The rollator of claim 2, wherein the rear legs are configured to pivot between a first position and a second position with respect to the front legs, wherein in the first position the rear legs form an acute angle with respect to the front legs, and wherein in the second position the rear legs form an angle with the front legs that is less than the acute angle or substantially parallel with the front legs.

4. The rollator of claim 1, wherein the handles are directed rearward for holding by an operator.

5. The rollator of claim 1, wherein the two wheels attached to the front legs are rotatably attached to the front legs.

6. The rollator of claim 1, wherein the plurality of platforms are arranged in a stepped configuration.

7. The rollator of claim 1, wherein the lower platform includes a front portion and a rear portion, and wherein the front portion of the lower platform extends forward of the frame.

8. The rollator of claim 1, further comprising a braking mechanism configured to brake one or more of the wheels.

9. The rollator of claim 8, further comprising a hand control mechanism operably connected to the braking mechanism for selective braking of the one or more of the wheels.

10. The rollator of claim 1, further comprising a basket that is removably attachable to the frame.

11. The rollator of claim 1, further comprising a tray that is attached to an upper portion of the frame.

12. A rollator comprising:

a frame having a front-facing portion, wherein the frame comprises a plurality of front legs and a plurality of rear legs;

handles attached to the frame and directed rearward, wherein the handles are positioned substantially within an area directly upward of the rear legs;

a plurality of wheels attached to the frame, wherein two of the wheels are attached to the front legs, wherein another two of the wheels are attached to the rear legs, wherein the two wheels attached to the rear legs are positioned substantially within an area directly downward of the handles;

an upper platform securely attached to both the front legs and the rear legs of the frame, wherein the upper platform is substantially centered between the front legs and the rear legs;

a lower platform securely attached to only the front legs of the frame at a position above the two wheels that are attached to the front legs and positioned lower than the upper platform, wherein the lower platform includes a front portion and a rear portion, wherein the front portion of the lower platform extends forward of the frame, wherein the lower platform defines a substantially flat upward facing surface that extends entirely between a forward position and a rearward position of where the lower platform is attached to the frame, wherein the flat upward facing surface of the lower platform also extends entirely between the front legs of the frame, wherein the lower platform is attached to the frame above the wheels, and wherein the upper platform is positioned substantially outside of an area directly upward of the lower platform such that the lower platform is operable for a person to sit upright on the lower platform.

13. The rollator of claim 12, further comprising a braking mechanism configured to brake one or more of the wheels.

14. The rollator of claim 13, further comprising a hand control mechanism operably connected to the braking mechanism for selective braking of the one or more of the wheels.

* * * * *